United States Patent [19]

Takikawa et al.

[11] Patent Number: 5,225,052

[45] Date of Patent: Jul. 6, 1993

[54] PROCESS FOR THE PRODUCTION OF ALKALI METAL HYPOPHOSPHITES

[75] Inventors: Yoshihiro Takikawa; Masaoki Oda; Takashi Takeuti; Katsutoshi Shibata; Atsushi Kanayama, all of Shinminato, Japan

[73] Assignee: Rinkagaku Kogyo Co., Ltd., Toyama, Japan

[21] Appl. No.: 707,000

[22] Filed: May 29, 1991

[30] Foreign Application Priority Data

May 30, 1990 [JP] Japan .................................. 2-140753

[51] Int. Cl.$^5$ .......................... C25B 1/14; C01B 25/26
[52] U.S. Cl. ........................................ 204/90; 423/307
[58] Field of Search .................. 204/90, 182.3, 182.4; 423/305, 307

[56] References Cited

PUBLICATIONS

Yamamoto et al., "Regeneration of bath for nickel coating", CA 111:62429r, 1989.
Zobel, "The Piesteritz hypophosphite process", CA 112:16121z, 1990.

Primary Examiner—John Niebling
Assistant Examiner—Brian M. Bolam
Attorney, Agent, or Firm—Wenderoth, Lind & Ponack

[57] ABSTRACT

High purity alkali metal hypophosphites are produced in high efficiency by a simple step of using no other separating agents than white phosphorus, alkali metal hydroxides and water as reaction raw materials, resulting in no need of a complicated procedure for removing impurities. This process comprises reacting white phosphorus and an alkali metal hydroxide in an aqueous medium to prepare a crude solution of an alkali metal hypophosphite containing the phosphite, feeding the crude solution to a desalting compartment of an electrodialytic cell in which cation exchange membranes and univalent anion permeable membranes are alternately arranged between a cathode and an anode to form at least one pair of a desalting compartment and a concentrating compartment, so as to separate the hypophosphite from the crude solution, during which a dilute solution of an alkali hypophosphite is fed to the concentrating compartment, subjecting them to electrodialysis, withdrawing the purified solution of the alkali metal hypophosphite from the concentrating compartment and concentrating and crystallizing the the thus purified solution.

4 Claims, 1 Drawing Sheet

PROCESS FOR THE PRODUCTION OF ALKALI METAL HYPOPHOSPHITES

BACKGROUND OF THE INVENTION

1. Field of the Invention

This invention relates to a process for the production of an alkali metal hypophosphite by an ion-exchange membrane electrodialysis method and a process for the separate production of an alkali metal hypophosphite and an alkali metal phosphite by an ion-exchange membrane electrodialysis method.

2. Description of the Prior Art

Alkali metal hypophosphites have been used as synthetic resin stabilizers, catalysts for organic synthesis, reducing agents for industrial use, etc. and in particular, sodium hypophosphite has widely been used as a chemical for electroless plating.

Alkali metal hypophosphites are ordinarily prepared by the reaction of white phosphorus with an aqueous solution of alkali metal hydroxide, during which a side reaction of forming the phosphite unavoidably takes place with formation of the hypophosphite. Thus, there is always a considerable amount of the phosphite in the reaction mixture. The amount of the phosphite, depending on the reaction conditions, reaches 50% when it is formed in the greatest amount. In the general process for the production of an alkali metal hypophosphite, therefore, it is indispensable to provide a step of separating and removing the phosphite from the reaction mixture. Up to the present time, separation of the phosphite has been carried out by precipitating and removing it as calcium phosphite utilizing the fact that calcium hypophosphite is water-soluble, while calcium phosphite is water-hardly soluble. For example, this is accomplished by adding a water-soluble calcium compound as a precipitant to the reaction mixture. When using calcium hydroxide as a precipitant, however, the pH is raised by the precipitating reaction at the initial period, the concentration of calcium ion is lowered and a part of the phosphite remains in the solution so that complete separation of the phosphite is impossible. When using a calcium salt such as calcium chloride, a new impurity such as chloride ion is carried in the reaction system, which must subsequently be removed.

In order to avoid the disadvantage of such a calcium precipitant, it has been proposed in U.S. Pat. No. 2,938,770 to precipitate and separate calcium phosphite with a solution of calcium hypophosphite. In this case, however, it is required to separately prepare calcium hypophosphite as a precipitant by the treatment of sodium hypophosphite with an ion exchange resin and the steps including a regenerating treatment are very complicated.

Another method for separating the byproduced phosphite as a less soluble calcium salt comprises reacting white phosphorus and an alkali metal hydroxide in the presence of calcium hydroxide, for example, by adding white phosphorus to a slurry of calcium hydroxide suspended in an aqueous solution of the alkali metal hydroxide. In this method, the soluble calcium content is contained in the reaction system, so the byproduced phosphite is precipitated as less soluble calcium phosphite, as soon as it is formed, without changing the pH of the solution. Consequently, the phosphite is surely separated and no other impurities are introduced. In the filtrate from which the calcium phosphite has been precipitated and separated, however, there are dissolved excessive calcium hydroxide and soluble calcium hypophosphite in addition to the alkali metal hypophosphite and therefore, it is necessary to remove them.

A method of removing the dissolved calcium content has been proposed in German Patent No. 2,006,632, which comprises first neutralizing the filtrate with carbon dioxide to precipitate the excessive calcium hydroxide in the form of calcium carbonate, further adding sodium carbonate to precipitate calcium carbonate from the calcium hypophosphite and then neutralizing the remaining sodium carbonate with hypophosphorous acid. U.S. Pat. No. 4,379,132 describes a method comprising precipitating and separating a part of the dissolved calcium contents with phosphoric acid or an acid phosphate with the co-production of an insoluble calcium phosphate and converting the calcium hypophosphite dissolved in the filtrate into the sodium salt by the use of an ion exchange resin of sodium type.

Furthermore, U.S. Pat. No. 4,521,391 describes a method comprising adding sodium hydrogen carbonate to a filtrate after separating calcium phosphite to precipitate dissolved calcium hydroxide and further adding sodium carbonate to the filtrate to precipitate and separate the dissolved calcium hypophosphite as calcium carbonate.

As described above, the method of the prior art in which the phosphite is subjected to solid-liquid separation as the less soluble calcium salt must necessarily be carried out in batchwise manner and thus needs steps of separating calcium phosphite and removing soluble impurities resulting from the precipitants, so that the process is complicated and is of low efficiency.

Sodium hypophosphite is very useful as a reducing agent for electroless plating, but of late, requirements for the quality of sodium hypophosphite have become severer since the application of the electroless plating process has spread in the high technical field and it has eagerly been desired to provide high purity sodium hypophosphite with a decreased content of impurities having bad influence upon the adhesiveness of plating coatings and the reactivity of plating solutions. However, the prior art cannot fully deal with these problems.

SUMMARY OF THE INVENTION

It is an object of the present invention to provide a process for producing high purity alkali metal hypophosphites with high efficiency by a simple step of using no other separating agents than white phosphorus, alkali metal hydroxides and water as reaction raw materials, resulting in no need of a complicated procedure for removing impurities.

It is another object of the present invention to provide a process for the continuous production of alkali metal hypophosphites by only a liquid processing.

It is a further object of the present invention to provide a new process for the separation of alkali metal hypophosphites and alkali metal phosphites and a process for separately producing alkali metal hypophosphites and alkali metal phosphites by the reaction of white phosphorus and an aqueous solution of alkali metal hydroxides.

These objects can be attained by a process for the production of an alkali metal hypophosphite which comprises reacting white phosphorus and an alkali metal hydroxide in an aqueous medium to prepare a crude solution of an alkali metal hypophosphite containing the phosphite, feeding the crude solution to a desalting compartment of an electrodialytic cell, in which cation exchange membranes and univalent anion permeable membranes are alternately arranged between a cathode compartment and an anode compartment, which will hereinafter be referred to as "cathode and anode" simply, to form at least one pair of a desalting compartment and a concentrating compartment, so as to separate the hypophosphite from the crude solution, during which a dilute solution of an alkali hypophosphite is fed to the concentrating compartment, subjecting them to electrodialysis, withdrawing the purified solution of the alkali metal hypophosphite from the concentrating compartment, and concentrating the purified solution and crystallizing the alkali metal hypophosphite.

BRIEF DESCRIPTION OF THE DRAWINGS

The accompanying drawing is to illustrate in detail the priciple and merits of the present invention:

DETAILED DESCRIPTION OF THE INVENTION

Figure 1:
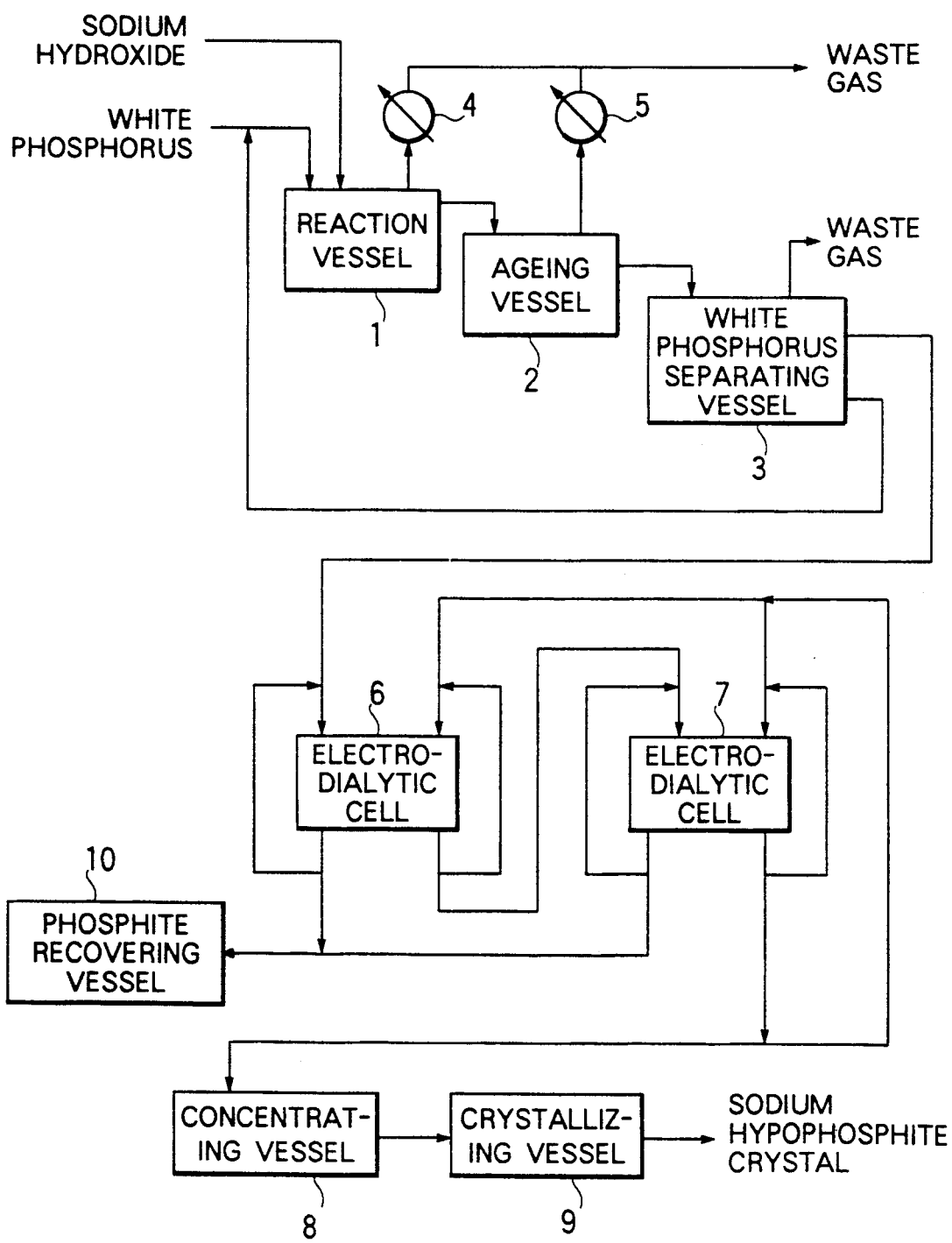
FIG. 1 is a block diagram showing one embodiment of the process for the continuous production of alkali metal hypophosphites according to the present invention.

The inventors have made studies to develop a process for producing an alkali metal hypophosphite without effecting a plurality of solid-liquid separating operations as in the prior art, and consequently, have found that a high purity alkali metal hypophosphite can be obtained by reacting white phosphorus and an alkali metal hydroxide to obtain a crude solution of alkali metal hypophosphite containing the phosphite and then subjecting the crude solution to electrodialysis using ion-exchange membranes to remove the phosphite.

It is further found by our studies that a mixed solution containing an alkali metal hypophosphite and an alkali metal phosphite can effectively be separated by an electrodialytic apparatus using specified ion-exchange membranes including univalent anion permselective membranes, in particular, when the composition and pH thereof is in the specified range. That is, the selective permeability of the hypophosphite ion in the presence of the phosphite ion largely depends on the pH and the composition of the solution.

The present invention is based on this finding. According to the present invention, alkali metal hypophosphites can effectively be prepared by a very simple operation without effecting complicated solid-liquid separating operations in many stages, as in the prior art.

Accordingly, the present invention provides a process for the production of an alkali metal hypophosphite which comprises reacting white phosphorus and an alkali metal hydroxide in an auqueous medium to prepare a crude solution of an alkali metal hypophosphite containing the phosphite, feeding the crude solution to a desalting compartment of an electrodialytic cell in which cation exchange embranes and univalent anion permeable membranes are alternately arranged between a cathode and anode to form at least one pair of a desalting compartment and a concentrating compartment, during which a dilute solution of an alkali hypophosphite is fed to the concentrating compartment, subjecting them to electrodialysis, withdrawing the purified solution of the alkali metal hypophosphite from the concentrating compartment and concentrating and crystallizing the thus purified solution. Furthermore, the present invention is concerned with a process for the continuous production of alkali metal hypophosphites, for the separation of alkali metal hypophosphites and alkali metal phosphites and for the separative production of the same, based on the above described fundamental process.

In this specification, by alkali metals are meant sodium, potassium and lithium.

In Table 1 are shown the compositions of a mixed solution of an alkali metal hypophosphite and alkali metal phosphite with a pH of 10 (hereinafter referred to as "D solution") and a solution obtained by subjecting the mixed solution to electrodialysis in an ion-exchange membrane electrodialytic apparatus composed of cation-exchange membranes and univalent ion permselective membranes (hereinafter referred to as "C solution"):

TABLE 1

| $NaH_2PO_2/(NaH_2PO_2 + Na_2HPO_3)$ (g/g) | | | | | | | | | |
|---|---|---|---|---|---|---|---|---|---|
| D | 0.1 | 0.15 | 0.2 | 0.3 | 0.5 | 0.6 | 0.8 | 0.9 | 0.97 |
| C | 0.45 | 0.84 | 0.9 | 0.94 | 0.97 | 0.98 | 0.99 | 0.992 | 0.998 |

It will clearly be understood from the results of Table 1 that C rapidly increases at about $D=0.1$ and the selective permeability of hypophosphite is markedly increased, while C is 0.9 or more at $D=0.2$ or more and the selectivity is further increased. When C solution having a C value of 0.9 or more obtained from D solution having a D value of 0.2 or more is again subjected to electrodialysis, the C value is 0.99 or more. That is, the permeability of phosphite is 1/10 or less of that of hypophosphite at $D=0.2$ or more and 1/100 or less of that of hypophosphite at $D=0.9$ or more.

Such a high selective permeability of hypophosphite is particularly remarkable when the solution has a pH of 8 to 13 and when pH is less than 8, the permeability of phosphite is increased, resulting in lowering of the C value and deterioration of the separative capacity.

The influence of the concentration of the mixed solution upon the selective permeability are relatively small and the relationship between the D and C values is stable in the range of several percents to several ten percents. In the reaction of the white phosphorus and alkali metal hydroxide, it is confirmed by the inventors that a crude solution of alkali metal hypophosphite with a pH of 8 to 13 and a D value of at least 0.2 can be obtained by the use of about 1 mole or less of an alkali metal hydroxide per 1 gram atom of white phosphorus.

Therefore, when this crude solution of alkali metal hypophosphite is introduced into an ion-exchange membrane electrodialytic apparatus without any processing and then subjected to electrodialysis, the hypophosphite can selectively be obtained with a high efficiency. This means that it is rendered possible to produce alkali metal hypophosphites by only a simple processing of the solution without necessity of using a separating agent or precipitant and a solid-liquid separating apparatus.

Preparation of the crude solution of an alkali metal hypophosphite is ordinarily carried out by dropwise addition of a solution of alkali metal hydroxide to an aqueous dispersion of white phosphorus and it is preferable to adjust the initial concentration of the aqueous dispersion of white phosphorus to at least 5 wt % and the concentration of the solution of alkali hydroxide to at least 10 wt % so as to advance the reaction smoothly and conduct the electrodialysis effectively. The proportion of the alkali metal hydroxide to the white phosphorus is so adjusted that a reaction solution with a pH of 8 to 13 be obtained. White phosphorus and alkali metal hydroxide are reacted even at room temperature, but it is preferable to heat at 50° to 100° C. so as to effect the reaction in effective manner. Since the reaction rate is large in the initial period and is lowered with the progress of the reaction, ageing is carried out if necessary after the alkali metal hydroxide is added.

When this crude solution of alkali metal hypophosphite is subjected to electrodialysis, the concentration of the hypophosphite is lowered with the passage of time, the C value of the resulting electrodialyzed solution is gradually lowered and the quantity of the phosphite permeated is increased. Thus, the first electrodialysis is ordinarily carried out up to a C value of about 0.9 and the resulting solution, as D solution, is again subjected to electrodialysis to obtain a solution of alkali metal hypophosphite with a C value of at least 0.99. If the number of electrodialyses is increased, an alkali metal hypophosphite of very high purity can be obtained.

As an electrodialytic apparatus for carrying out the process of the present invention, there can be used an ordinary electrodialytic cell, in which electrodes are provided at both the ends and one or more cation exchange membranes and one or more anion exchange membranes are alternately arranged between the electrodes to form at least one pair of desalting compartment and concentrating compartment. In the present invention, it is essential to use a univalent anion selectively permeable membrane as the anion exchange membrane, but ion-exchange membranes including the anion exchange membranes can be used independently of the quality of the membrane, the process for the production thereof, the principle of permeating, etc.

Of the compartments partitioned by two kinds of ion-exchange membranes, a compartment provided with a univalent anion selectively permeable membrane at the anode side and a cation-exchange membrane at the cathode side is a desalting compartment, and there is another compartment adjacent to the desalting compartment, which is called a concentrating compartment. A crude solution of an alkali metal hypophosphite is circulated in the desalting compartment and a dilute solution of the alkali metal hypophosphite, as an electrolyte, is circulated in the concentrating compartment. Through both electrode compartments is passed and cycled a solution of sodium sulfate as an electrolyte. Electric current is supplied in a current density of 1 to 3 $A/dm^2$, and the area of the ion-exchange membranes, the concentrations of the electrolyte and the electrodialysis time can be determined depending on the concentration of the crude alkali metal phosphite solution and the amount thereof.

The cations in the crude hypophosphite solution fed to the desalting compartment are permeated through the cation exchange membrane at the cathode side into the adjacent concentrating compartment and the hypophosphite ions as univalent anions are passed through the univalent anion permselective membrane at the anode side into the adjacent concentrating compartment. Since each of the compartments is maintained electrically neutral during the electrodialysis, the permeated amounts of cations and anions are substantially the same, so that the alkali metal hypophosphite is permeated in the concentrating compartment and the alkali metal phosphite is retained in the desalting compartment.

Multistage electrodialysis can be carried out by the use of the same cell after removing the solution in the desalting compartment, but can more effectively be carried out when additionally using another electrodialytic cell arranged in series. If necessary, the number of the electrodialytic cells is increased to shorten the processing time, whereby the efficiency can further be increased. The solution of the alkali metal hypophosphite obtained from the concentrating compartment is concentrated and crystallized in conventional manner to yield hypophosphite crystals.

In the present invention, other reagents than the reaction raw materials are not fundamentally used and the process is simplified to reduce the possibility of contamination with impurities. Thus, the alkali metal hypophosphite obtained by concentrating and crystallizing the solution of the alkali metal hypophosphite in the concentrating compartment contains few impurities except a very small amount of the alkali metal phosphite and is of very high purity. In the prior art method wherein the phosphite is precipitated and separated as a less soluble calcium salt, separating operations in many stages such as filtering, washing, etc. are required, resulting in necessity of large and complicated apparatus, while in the present invention, the process is so simple that even a small apparatus can be operated in a sufficiently efficient manner and both the installation and operation costs can markedly be lowered. This is very economical.

The process for the production of an alkali metal hypophosphite from white phophorus and an alkali metal hydroxide has an advantage of a higher reaction speed in comparison with the other process jointly using calcium hydroxide, but on the other hand, the former process has so many problems in the purification step that it cannot be put to practical use as described above. Since the problems of removing the phosphite can be solved by the present invention, however, efficient production of alkali metal hypophosphites by only white phosphorus and alkali metal hydroxides, which are highly reactive, can be rendered possible.

The present invention provides a process for producing alkali metal hypophosphites in a simple and continuous manner because of being free from the solid-liquid separating operation.

In the process for the continuous production thereof, it is required to always use white phosphorus in an excessive quantity to the alkali metal hydroxide. Presence of the excessive white phosphorus can be achieved by maintaining such a state that the unreacted white phosphorus is always surely present in a reaction vessel. When the amount of white phosphorus used is not excessive, the reaction rate is lowered and the benefit of the continuous production is lost. Thus, the reaction is always carried out in the presence of the unreacted white phosphorus.

A process for the continuous production of alkali metal hypophosphite according to the present invention will now be illustrated with reference to the accompanying drawing without limiting the same.

Referring to FIG. 1, the reaction system as one embodiment suitable for carrying out the process for producing alkali metal hypophosphites consists of a reaction vessel 1, an ageing vessel 2 and a separating vessel 3 connected with each other, the reaction vessel 1 and ageing vessel 2 being provided with stirrers and all the vessels 1 to 3 being provided with exhaust pipes for exhausting waste gases W. Depending on the reaction conditions, the ageing vessel 2 can be omitted so that the reaction vessel 1 and separation vessel 3 can directly be connected. The reaction system is previously heated to a temperature of higher than the melting point of white phosphorus by a heater and replaced with an inert gas such as nitrogen gas. Molten white phosphorus and a solution of an alkali metal hydroxide are continuously fed to the reaction vessel 1 respectively from reservoirs and reacted with strong agitation. The reaction take place immediately and rapidly. The reaction mixture containing an excessive quantity of white phosphorus is continuously fed to the ageing vessel 2 and is successively reacted adequately by stirring. The reaction mixture is then fed continuously from the ageing vessel 2 to the separating vessel 3 functioning as a decanter, where the unreacted white phosphorus with a density of 1.7 is rapidly precipitated and separated from the crude solution of the alkali metal hypophosphite containing the phosphite.

The precipitated white phosphorus is withdrawn from the bottom of the separating vessel 3, recycled to the white phosphorus reservoir and reused. On the other hand, the crude solution of the alkali metal hypophosphite is subjected to electrodialysis in a first electrodialytic cell 6 having the structure as described above. The resulting solution from the concentrating compartment of the first electrodialytic cell 6 is further fed to a second similar electrodialytic cell 7 and subjected to electrodialysis again to further increase the removal ratio of the phosphite. The solution in the concentrating compartment is then concentrated and crystallized through a concentrating vessel 8 and a crystallizing vessel 9 to yield a high purity crystal of alkali metal hypophosphite. On the other hand, the alkali metal phosphite is obtained from the solution in the desalting compartment having a high content of the phosphite and stored in a phosphite recovering vessel 10. In FIGS. 1, 4 and 5 respectively designate refluxing condensers.

The feature of the process of the present invention consists in obtaining the byproduced phosphite as a useful alkali metal phosphite. That is, the crude solution of an alkali metal hypophosphite is subjected to electrodialysis to permeate the alkali metal hypophosphite in the concentrating compartment, while the alkali metal phosphite is not permeated but is retained in the desalting compartment. Accordingly, when the solution in the desalting compartment is concentrated after the electrodialysis, there is obtained an alkali metal phosphite substantially free from the hypophosphite.

Up to the present time, an alkali metal phosphite byproduced in the production of the alkali metal hypophosphite has been subjected to solid-liquid separation through formation of an insoluble alkaline earth metal salt. However, the alkaline earth metal salt of phosphorous acid is of no utility in industry as is, but as a feed. On the other hand, an alkali metal salt of phosphorous acid is more useful in industry as additives to polymers, catalysts for the production of polymers, etc. and thus, the alkaline earth metal phosphite is ordinarily converted into the corresponding alkali metal phosphite. The process of the present invention is more advantageous because of directly obtaining the phosphite in the form of the useful alkali metal phosphite as compared with the prior art process.

The present invention fundamentally relates to a process for the production of an alkali metal hypophosphite based on the reaction of white phosphorus and an alkali metal hydroxide in an aqueous medium and furthermore provides also a very useful process for the separation of each component from the mixed solution of the phosphite and hypophosphite.

According to the inventor's studies, it is found that when the reaction of white phosphorus and an alkali metal hydroxide in the presence of a specified small amount of an alkaline earth metal hydroxide, the amount of the phosphite byproduced is decreased and the yield of the hypophosphite is increased. In this case, the amount of the alkaline earth metal hydroxide to be added is preferably 0.01 to 0.2 mol per 1 gram atom of white phosphorus. Under the situation, a part of the thus formed phosphite is precipitated as the alkaline earth metal salt and the residual part thereof remains dissolved in the solution. Therefore, after filtering and separating the precipitate of the alkaline earth metal salt from the reaction mixture, the filtrate is subjected to electrodialysis in an ion exchange membrane electrodialytic cell to obtain the hypophosphite. This process needs a filtering operation of the alkaline earth metal phosphite, but has an advantage of increasing the yield of the hypophosphite. If the amount of the alkaline earth metal hydroxide added is less than the lower limit, there is no effect of increasing the yield, while if more than the upper limit, the amounts of the alkali metal hydroxide and alkaline earth metal hydroxide dissolved in the solution are increased and free alkali and the less soluble alkaline earth metal phosphite formed during electrodialysis deteriorate the capacity of the ion exchange membranes. Thus, an operation of separating them is further required. This is not preferable.

When the amount of the alkaline earth metal hydroxide used is in the range of the present invention, the added alkaline earth metal is almost precipitated as a less soluble compound so that only a very small amount of the alkaline earth metal is present in the solution and the electrodialytic process is hardly affected. Since the byproduced phosphite is partly removed as the alkaline earth metal salt, the content of the phosphite in the crude solution of the alkali metal hypophosphite is relatively low and the electrodialysis of the hypophosphite can readily be carried out. In this case, therefore, the time required for the electrodialysis can be shortened and the hypophosphite can be produced in more effective manner.

The ion-exchange membranes used in the electrodialytic process of the present invention are preferably strongly acidic cation-exchange membranes and univalent ion permselective, strongly basic anion-exchange membranes. The commercially available strongly acidic ion-exchange membranes for electrodialysis are based on cation-exchange resins each consisting of a styrene-divinylbenzene copolymer in which sulfonic groups are incorporated. In the past, those based on styrene-butadiene copolymers were produced. Formation of the membrane is carried out before or after the polymerization reaction, during which polyvinyl chloride is added for the purpose of imparting flexibility to the membrane and reinforcing materials such as fabrics of glass fibers or synthetic fibers are added to increase the membrane strength.

As the univalent ion permselective, strongly basic anion-exchange membrane, there can be used commercially available strongly basic anion-exchange reins prepared by incorporating chloromethyl groups or iodomethyl groups into a styrene-divinylbenzene copolymer, styrene-vinylpyridine copolymer or styrene-vinylpyridine-divinylbenzene copolymer, treating with a tertiary amine and then converting into the quaternary ammonium salt, followed by subjecting to membrane-making and imparting the univalent ion permselective property thereto. The treatment for imparting the univalent ion permselective property is generally carried out by subjecting the surface layer of the membrane to oxidation decomposition to lower the ion-exchange capacity and to suppress swelling by water, or by coating the surface of the membrane with a thin layer consisting of a different resin having a compact network structure. At the present time, the latter method is preferable.

The present invention will be further illustrated by reference to the following specific examples, the details of which should not be construed as limitations on the scope or the spirit of the invention.

EXAMPLE 1

800 ml of water and 150 g of white phosphorus were charged in a reactor of 2000 ml, equipped with a stirrer, nitrogen feed pipe, refluxing condenser (gas discharge), thermometer and dropping funnel, to which 775 g of a 25% aqueous solution of sodium hydroxide was dropwise added for 2 hours at 60° to 70° C. with agitation while feeding nitrogen gas thereto. After the dropwise addition, the reaction mixture was aged at 60° to 70° C. for 4 hours and a trace amount of the unreacted phosphorus was then separated by filtration, thus obtaining 1800 ml of a crude solution with a pH of 12.3, containing 265 g of sodium hypophosphite and 113 g of sodium phosphite.

This crude solution of sodium hypophosphite was subjected to electrodialysis by means of an electrodialytic apparatus for experiment, TS-2-10 type [commercial name, manufactured by Tokuyama Soda Co., Ltd., composed of 10 sets of cation-exchange membranes, NEOSEPTA CM-1 (commercial name-trade mark-manufactured by Tokuyama Soda Co., Ltd.) and univalent anion permselective exchange membranes, NEOSEPTA ACS (commercial name-trade mark-manufactured by Tokuyama Soda Co., Ltd.) and using 800 ml of a 5% solution of sodium sulfate as an electrolyte].

800 ml of the above described crude solution of sodium hypophosphite was charged in the desalting compartment and 800 ml of a solution containing 16 g of sodium hypophosphite (chemical reagent first grade) was charged in the concentrating compartment, which were then subjected to electrodialysis at a current density of 2 A/dm$^2$ while recycling the solution. The sodium hypophosphite was selectively permeated depending on the dialysis time and there were obtained a solution containing 0.8 g of sodium phosphite and 84.9 g of sodium hypophosphite from the concentrating compartment after an electrodialysis time of 60 minutes and a solution containing 3.2 g of sodium phosphite and 123.7 g of sodium hypophosphite after 100 minutes.

Furthermore, 800 ml of the crude solution of sodium hypophosphite was subjected to electrodialysis for 100 minutes under the same conditions to obtain 1005 ml of a solution containing 3.2 g of sodium phosphite and 124.1 g of sodium hypophosphite, which was then withdrawn from the concentrating compartment and again subjected to electrodialysis for 80 minutes under the same conditions to obtain 965 ml of a solution containing 0.1 g of sodium phosphite and 101.8 g of sodium hypophosphite. The resulting solution was concentrated and crystallized to obtain sodium hypophosphite crystals ($NaH_2PO_2 \cdot H_2O$) whose analytical data are tabulated in Table 1. For comparison, the analytical data of the commercially available sodium hypophosphite are jointly shown in Table 1. As is evident from these data, the sodium hypophosphite of the present invention has much higher purity as compared with the commercially available article.

TABLE 1

| Analytical Item | | Commercially Available Article | Sodium Hypophosphite of Example 1 |
|---|---|---|---|
| Cl | ppm | 40 | 20 |
| SO$_4$ | ppm | 140 | 10 |
| Pb | ppm | 0.5 | <0.2 |
| Fe | ppm | 0.5 | <0.2 |
| Ca | ppm | 360 | 5 |
| As | ppm | <1 | <0.5 |
| Na$_2$HPO$_3$ | % | 0.8 | 0.1 |
| NaH$_2$PO$_2$ | % | 82.9 | 84.2 |

EXAMPLE 2

600 ml of water and 150 g of white phosphorus were charged in the same apparatus as used in Example 1, heated at 60° to 70° C. while feeding nitrogen gas thereto and 1080 g of a 25% aqueous solution of potassium hydroxide was dropwise added for 2 hours with agitation. After the dropwise addition, the reaction mixture was aged for 4 hours at 60° to 70° C. and a very small amount of the unreacted white phosphorus remaining was separated by filtration to obtain 1900 ml of a crude solution with a pH of 12.2 containing 302 g of potassium hypophosphite and 153 g of potassium phosphite.

The whole quantity of the crude solution of potassium hypophosphite was charged in the desalting compartment of the same electrodialytic cell as in Example 1 and 1000 ml of a solution containing 25 g of potassium hypophosphite (prepared by the use of hypophosphorous acid and potassium hydroxide with chemical reagent first grade) was charged in the concentrating compartment thereof, which were then subjected to electrodialysis for 180 minutes in an analogous manner to Example 1 while recycling the solution. 1300 ml of a solution containing 240 g of potassium hypophosphite and 5.4 g of potassium phosphite was obtained from the concentrating compartment, again charged in the desalting compartment and again subjected to electrodialysis for 150 minutes under the same conditions to obtain 1100 ml of a solution containing 205 g of potassium hypophosphite and 0.3 g of potassium phosphite, which was then concentrated and crystallized, thus obtaining crystalline potassium hypophosphite ($KH_2PO_2$) with a phosphite content of 0.1%.

EXAMPLE 3

600 ml of water and 200 g of white phosphorus were charged in the same apparatus as used in Example 1 and 520 g of a 25% aqueous solution of sodium hydroxide was dropwise added for 30 minutes at 90° to 95° C. with agitation. After the dropwise addition, the reaction mixture was aged for 2 hours at 90° to 95° C. and the unreacted white phosphorus was separated to obtain 1600 ml of a crude solution with a pH of 8.1 containing 185 g of sodium hypophosphite and 79 g of sodium phosphite.

800 ml of the crude solution of sodium hypophosphite was subjected to electrodialysis for 20 minutes using the same apparatus as used in Example 1. 18.3 g of sodium hypophosphite and 1.3 g of sodium phosphite were permeated in the concentrating compartment thereof with their molar ratio ($Na_2HPO_3/NaH_2PO_2$) of 0.05.

Then, the above described crude solution of sodium hypophosphite was controlled to a pH of 12 and subjected to electrodialysis in the similar manner to described above. Consequently, 20.5 g of sodium hypophoaphite and 0.3 g of sodium phosphite were permeated in the concentrating compartment with a molar ratio of 0.01.

Using sodium hypophosphite of reagent special grade and phosphorous acid and sodium hydroxide of reagent first grade, a solution having the same composition as the above described reaction solution and a pH of 4 was prepared and subjected to electrodialysis in the similar manner. Consequently, 16.8 g of sodium hypophosphite and 5.5 g of sodium phosphite were permeated in the concentrating compartment with a molar ratio of 0.23.

As apparent from the above results, sodium hypophosphite was more effectively selected and permeated from the basic solution.

EXAMPLE 4

Using the apparatus as shown in the accompanying drawing, sodium hypophosphite was continuously prepared. The reaction vessel 1 had a volume of 2000 ml and was provided with a stirrer, nitrogen feed pipe, refluxing condenser, thermometer and two sets of dropping means and the ageing vessel 2 had the same volume as the reaction vessel and was provided with a stirrer, refluxing condenser and thermometer. As a preparatory operation, the crude solution of sodium hypophosphite with a pH of 8.1 was prepared in an analogous manner to Example 3, fed 1000 ml by 1000 ml to the reaction vessel 1 and the ageing vessel 2, heated at 90° to 95° C. and replaced by nitrogen gas.

In the reaction vessel 1 and ageing vessel 2, the stirrers were moved and a 12% aqueous solution of sodium hydroxide and molten white phosphorus were dropwise added thereto. The dropwise addition rate was adjusted to 800 ml/hr of the aqueous solution of sodium hydroxide and 174 g/hr of the molten white phosphorus so that excessive white phosphorus is always present in the reaction vessel.

The reaction mixture was continuously fed to the ageing vessel 2, heated, stirred and then fed to the separation vessel 3 where it was settled at 50° to 60° C. to separate the white phosphorus from the crude solution of sodium hypophosphite. The unreacted white phosphorus was recovered at a rate of 87 g/hr, stored in a white phosphorus reservoir and recycled in the raw material white phosphorus vessel.

The crude solution of sodium hypophosphite was obtained at a rate of 830 ml/hr from the separation vessel 3 and its composition was varied with the passage of time which was, however, approximately 148 g/hr of sodium hypophosphite and 60 g/hr of sodium phosphite.

This crude solution of sodium hypophosphite was introduced into the desalting compartment of the same electrodialytic cell as used in Example 1, but using 20 sets of the ion-exchange membranes, and subjected to electrodialysis under the same conditions as those of Example 1. The electrodialysis was carried out using two electrodialytic cells of the same tupe, connected in series, in which the solution obtained from the concentrating compartment of the first electrodialytic cell was introduced into the desalting compartment of the second electrodialytic cell and again subjected to electrodialysis. The feed rate to the first electrodialytic cell was 830 ml/hr corresponding to the quantity of the crude solution of sodium hypophosphite obtained and the feed rate to the second electrodialytic cell was 800 ml/hr. Consequently, from the concentrating compartment of the second electrodialytic cell was obtained 800 ml of a solution containing 108 g of sodium hypophosphite and 0.2 g of sodium phosphite per hour which was then concentrated and crystallized to obtain a high purity crystalline sodium hypophosphite having a phosphite content of 0.1%.

The solution obtained from the desalting compartment of each of the electrodialytic cells was subjected to electrodialysis in an analogous manner to Example 5 using another electrodialytic cell to crystallize sodium phosphite from the solution of the desalting compartment and the solution of the concentrating compartment was added to the crude solution of sodium hypophosphite obtained from the reaction system, followed by recycling to the electrolytic process.

EXAMPLE 5

570 ml of a solution containing 10 g of sodium hypophosphite and 45 g of sodium phosphite, obtained from the desalting compartment after electrodialysis for 100 minutes in Example 1, was charged in the desalting compartment, while 780 ml of a solution containing 23 g of sodium hypophosphite and 2.8 g of sodium phosphite, obtained from the desalting compartment in the second electrodialysis, was charged in the concentrating compartment, followed by subjecting to electrodialysis for 20 minutes in the same electrodialytic apparatus. Then, 510 ml of a solution containing 0.2 g of sodium hypophosphite and 30 g of sodium phosphite was obtained from the desalting compartment and subjected to concentration and crystallization, thus obtaining a crystalline sodium phosphite containing 0.6% by weight of sodium hypophosphite.

On the other hand, 850 ml of a solution containing 33 g of sodium hypophosphite and 18 g of sodium phosphite in the concentrating compartment was mixed with the crude solution of sodium hypophosphite obtained from the reaction system, followed by recycling to the electrodialytic process.

EXAMPLE 6

800 ml of water, 100 g of white phosphorus and varied amounts of calcium hydroxide were charged in the same apparatus as used in Example 1, to which 440 g of a 25 wt % aqueous solution of sodium hydroxide was dropwise added at 70° to 80° C. for 1 hour with agitation while bubbling nitrogen gas, followed by ageing at 80° to 90° C., filtering the solid product and washing. The thus resulting crude solution of sodium hypophosphite was controlled to a liquid quantity of 1500 ml and subjected to composition analysis to obtain results as shown in Table 2. As is evident from Table 2, in the range of calcium hydroxide to white phosphorus molar ratio [$Ca(OH)_2/P$] of 0.01 to 0.2, the amount of sodium hypophosphite formed is increased and the electrodialysis is hardly affected. If the molar ratio is larger than this range, the amounts of dissolved calcium and free alkali are increased, so that practice of the electrodialysis is difficult.

TABLE 2

| Ca/P Molar Ratio* | Contents in Crude Solution of Sodium Hypophosphite | | |
|---|---|---|---|
| | NaH$_2$PO$_2$ (g) | Dissolved Ca (g) | Free NaOH (g) |
| 0 | 168 | 0.00 | 0.0 |
| 0.001 | 170 | 0.01 | 0.0 |
| 0.01 | 180 | 0.01 | 0.0 |
| 0.1 | 181 | 0.05 | 1.0 |
| 0.2 | 181 | 0.04 | 4.0 |
| 0.3 | 180 | 0.41 | 14.7 |

*Ca/P Molar Ratio: molar number of calcium hydroxide to 1 gram atom of white phosphorus As illustrated above in detail, the present invention is concerned with a process for the production of alkali metal hypophosphites using white phosphorus and alkali metal hydroxides as raw materials and using the ion-exchange membrane electrodialysis method, whereby the following advantages or benefits can be obtained:

The process of the present invention does not need complicated apparatus such as multi-stage solid-liquid separation means which are essential for the prior art process and can be accomplished in effective manner by a simple apparatus or simple operation because of a simplified process comprising no solid-liquid operations. Furthermore, the process of the present invention is very economical, since the costs required for the installations and operations can be decreased.

Since other separating agents or precipitants than the reaction raw materials are not used in the process of the present invention, there can be obtained high purity alkali metal hypophosphites free from impurities.

Since the process of the present invention is composed of only solution processing, the process can readily be rendered continuous and if the reaction conditions are suitably chosen, the processing time can be shortened to raise the efficiency.

Furthermore, the byproduced phosphite can be obtained as a useful alkali metal salt.

What is claimed is:

1. In a process for the production of an alkali metal hypophosphite comprising reacting white phosphorus with an aqueous solution of an alkali metal hydroxide to prepare a solution containing an alkali metal hypophosphite and alkali metal phosphite and separating and removing the alkali metal phosphite from the said solution, the improvement which comprises:

a) reacting molten white phosphorus and an aqueous solution of an alkali metal hydroxide having a concentration of at least 10 weight % in a proportion of about 1 mole of the alkali metal hydroxide to 1 gram atom of the white phosphorus to prepare a crude solution containing the alkali metal hypophosphite and alkali metal phosphite with a pH of 8 to 13 and an alkali metal hypophosphite/(alkali metal hypophosphite + alkali metal phosphite) component ratio by weight of at least 0.2, b) feeding the resulting crude solution to a desalting compartment of an electrodialytic cell, in which cation exchange memberanes and univalent anion permselective membranes are alternately arranged between a cathode compartment and an anode compartment to form at least one pair of a desalting compartment and a concentrating compartment, selectively subjecting the alkali metal hypophosphite to electrodialysis until the component ratio is at least 0.9 in the concentrating compartment and thus separating the alkali metal hypophosphite, and c) withdrawing the purified solution of the alkali metal hypophosphite from the concentrating compartment, concentrating the purified solution and then crystallizing the alkali metal phosphite.

2. A process for the continuous production of an alkali metal hypophosphite which comprises:

(a) continuously feeding an aqueous solution of an alkali metal hydroxide having a concentration of at least 10 wt. % and white phosphorus to a reactor having an inert gas atmosphere and maintained at a temperature higher than the melting point of white phosphorus, stirring and dispersing the white phosphorus while introducing an inert gas thereinto, carrying out the reaction under conditions such that molten white phosphorus is always present in the reactor, continuously withdrawing the reaction mixture containing alkali metal hypophosphite and alkali metal phosphite with an alkali metal hypophosphite/(alkali metal hypophosphite + alkali metal phosphite) component ratio by weight of at least 0.2, from the reactor and then feeding said reaction mixture to a separator connected with the reactor, (b) settling the reaction mixture in the separator in an inert gas atmosphere and maintained at a temperature of higher than the melting point of white phosphorus, thereby precipitating and separating the white phosphorus from the crude solution of the alkali metal hypophosphite, withdrawing the white phosphorus from the bottom of the separator, recycling to the reactor, continuously feeding the crude solution of the alkali metal hypophosphite to an electrodialytic cell, in which cation exchange membranes and univalent anion permselective membranes are alternatively arranged between a cathode compartment and an anode compartment to form at least one pair of a desalting compartment and a concentrating compartment, subjecting the crude solution to electrodialysis until the component ratio is at least 0.9 in the concentrating compartment and obtaining a purified solution of the alkali metal hypophosphite.

3. A process for the separate production of an alkali metal hypophosphite and an alkali metal phosphite, which comprises reacting white phosphorus and an alkali metal hydroxide in an aqueous medium wherein the concentration of the alkali metal hydroxide is at least 10 wt. %, to prepare a crude solution of an alkali metal hypophosphite containing the alkali metal phosphite, the alkali metal hypophosphite/(alkali metal hypophosphite + alkali metal phosphite) component ratio by weight being at least 0.2 in said crude solution, feeding the crude solution to a desalting compartment of an electrodialytic cell, in which cation exchange membranes and univalent anion permselective membranes are alternately arranged between a cathode compartment and an anode compartment to form at least one pair of a desalting compartment and a concentrating compartment, subjecting the crude solution to electrodialysis until the component ratio is 0.9 in the concentrating compartment obtaining the alkali metal hypophosphite from the purified solution of the alkali metal hypophosphite obtained from the concentrating compartment, further subjecting the phosphite-enriched solution obtained from the desalting compartment to electrodialysis to allow the remaining hypophosphite to permeate in the concentrating compartment and then obtaining the alkali metal phosphite from the purified solution of the phosphite.

4. The process as claimed in any one of claims 1, or 3, wherein the reaction of white phosphorus and an alkali metal hydroxide in an aqueous medium is carried out in the presence of an alkaline earth metal hydroxide in a proportion of 0.01 to 0.2 mol to 1 gram atom of the white phosphorus.

* * * * *